(12) United States Patent
Tornay (10) Patent No.: US 7,306,008 B2
(45) Date of Patent: Dec. 11, 2007

(54) WATER LEAK DETECTION AND PREVENTION SYSTEMS AND METHODS

(76) Inventor: Paul G. Tornay, 60965 Creekstone Loop, Bend, OR (US) 97702

( * ) Notice: Subject to any disclaimer, the term of this patent is extended or adjusted under 35 U.S.C. 154(b) by 347 days.

(21) Appl. No.: 11/099,351

(22) Filed: Apr. 5, 2005

(65) Prior Publication Data

US 2005/0224118 A1    Oct. 13, 2005

Related U.S. Application Data

(60) Provisional application No. 60/572,699, filed on May 20, 2004, provisional application No. 60/559,543, filed on Apr. 5, 2004.

(51) Int. Cl.
  *G05D 7/06*    (2006.01)
(52) U.S. Cl. .............................. 137/624.11; 137/487.5; 137/460; 137/558
(58) Field of Classification Search ........... 137/624.11, 137/624.12, 487.5, 460, 488, 558
See application file for complete search history.

(56) References Cited

U.S. PATENT DOCUMENTS

| | | | |
|---|---|---|---|
| 1,097,292 A | 5/1914 | Bower | |
| 1,210,738 A | 1/1917 | Ward | |
| 1,225,865 A | 5/1917 | Schneible | |
| 1,294,695 A | 2/1919 | Osterheld | |
| 1,335,874 A | 4/1920 | Caul | |
| 1,345,748 A | 7/1920 | Clover | |
| 1,583,007 A | 5/1926 | Ram | |
| 1,668,062 A | 5/1928 | Foerch | |
| 2,034,420 A | 3/1936 | Reiland et al. | |
| 2,596,691 A | 5/1952 | Jackson et al. | |
| 2,777,675 A | 1/1957 | Steizer et al. | |
| 3,506,033 A | 4/1970 | Haney | |
| 3,700,002 A | 10/1972 | Christie | |
| 4,092,085 A | 5/1978 | McMaster-Christie | |
| 4,180,088 A | 12/1979 | Mallett | |
| 4,253,231 A | 3/1981 | Nouet | |
| 4,276,903 A | 7/1981 | Spohr | |
| 4,406,398 A | 9/1983 | Perkins | |
| 4,414,994 A | 11/1983 | Hogan | |
| 4,518,955 A | 5/1985 | Meyer | |
| 4,543,553 A | 9/1985 | Mandai et al. | |
| 4,547,961 A | 10/1985 | Bokil et al. | |
| 4,558,207 A | 12/1985 | Litterst | |
| 4,623,451 A | 11/1986 | Oliver | |
| 4,705,060 A | 11/1987 | Goulbourne | |
| 4,735,231 A | 4/1988 | Jacquet | |

(Continued)

FOREIGN PATENT DOCUMENTS

GB     2276656     5/1994

(Continued)

*Primary Examiner*—Kevin Lee
(74) *Attorney, Agent, or Firm*—Knobbe, Martens, Olson & Bear LLP (57) ABSTRACT

Water leak detection and prevention systems and methods in which water is only delivered to the water pipes in the building when a faucet or appliance demands water and water is delivered through a normally closed shut off water valve. During the period that the main water is shut off, the water pressure in the water pipes is continuously monitored to detect a water leak in the building. Detection of a leak causes an alarm to be sounded and a continued closure of the shut off valve.

7 Claims, 11 Drawing Sheets

U.S. PATENT DOCUMENTS

| | | |
|---|---|---|
| 4,823,414 A | 4/1989 | Piersimoni et al. |
| 4,856,121 A | 8/1989 | Traylor |
| 4,911,200 A | 3/1990 | Ben-Arie |
| 5,004,014 A | 4/1991 | Bender |
| 5,007,453 A | 4/1991 | Berkowitz et al. |
| 5,046,519 A | 9/1991 | Senstrom et al. |
| 5,048,179 A | 9/1991 | Shindo et al. |
| 5,055,816 A | 10/1991 | Altman et al. |
| 5,062,442 A | 11/1991 | Senstrom et al. |
| 5,076,321 A | 12/1991 | Terry |
| 5,126,714 A | 6/1992 | Johnson |
| 5,161,563 A | 11/1992 | Thompson |
| 5,228,469 A | 7/1993 | Otten et al. |
| 5,251,653 A | 10/1993 | Tucker et al. |
| 5,257,000 A | 10/1993 | Billings et al. |
| 5,287,570 A | 2/1994 | Peterson et al. |
| 5,400,820 A | 3/1995 | Orth |
| 5,441,070 A | 8/1995 | Thompson |
| 5,487,214 A | 1/1996 | Walters |
| 5,568,825 A | 10/1996 | Faulk |
| 5,708,195 A | 1/1998 | Kurisu et al. |
| 5,771,920 A | 6/1998 | Jewett et al. |
| 5,782,263 A | 7/1998 | Isaacson, Jr. et al. |
| 5,794,653 A | 8/1998 | DeSmet et al. |
| 5,824,274 A | 10/1998 | Long |
| 5,858,215 A | 1/1999 | Burchard et al. |
| 5,911,240 A | 6/1999 | Kolar et al. |
| 5,913,236 A | 6/1999 | Wodeslavsky |
| 5,918,617 A | 7/1999 | Garth |
| 5,934,302 A | 8/1999 | Nemelka |
| 5,967,171 A | 10/1999 | Dwyer, Jr. |
| 5,971,011 A | 10/1999 | Price |
| 5,979,493 A | 11/1999 | Simpkins, Jr. |
| 6,093,313 A | 7/2000 | Bovaird et al. |
| 6,119,720 A | 9/2000 | Isaacson, Jr. et al. |
| 6,202,594 B1 | 3/2001 | Kirschner |
| 6,209,576 B1 | 4/2001 | Davis |
| 6,237,618 B1 | 5/2001 | Kushner |
| 6,253,785 B1 | 7/2001 | Shumake, Jr. et al. |
| 6,321,773 B1 | 11/2001 | Ramsby |
| 6,369,714 B2 | 4/2002 | Walter |
| 6,374,846 B1 | 4/2002 | DeSmet |
| 6,386,231 B1 | 5/2002 | Elser |
| 6,404,345 B1 | 6/2002 | Frasier |
| 6,481,634 B1 | 11/2002 | Zosimadis |
| 6,491,062 B1 | 12/2002 | Croft |
| 6,517,720 B1 | 2/2003 | Aldred et al. |
| 6,520,003 B1 | 2/2003 | Fox |
| 6,523,562 B2 | 2/2003 | Harper |
| 6,532,979 B1 | 3/2003 | Richter |
| 6,535,827 B1 | 3/2003 | Lestina et al. |
| 6,543,479 B2 | 4/2003 | Coffey et al. |
| 6,612,323 B1 | 9/2003 | Horne |
| 6,691,724 B2 | 2/2004 | Ford |
| 6,708,722 B1 * | 3/2004 | Goodenough ............ 137/487.5 |
| 6,753,554 B1 | 6/2004 | Gomes et al. |
| 7,114,516 B2 * | 10/2006 | Ito ........................ 137/624.11 |
| 2002/0148515 A1 | 10/2002 | Coffey et al. |
| 2003/0033867 A1 | 2/2003 | Posey et al. |
| 2004/0046671 A1 | 3/2004 | Ninberg |
| 2004/0134545 A1 | 7/2004 | Ford |

FOREIGN PATENT DOCUMENTS

| | | |
|---|---|---|
| GB | 2360365 A | 9/2001 |
| JP | 58081285 | 5/1983 |
| JP | 7317113 | 12/1995 |
| JP | 8334430 | 12/1996 |
| JP | 11158949 | 6/1999 |
| JP | 2002129606 | 5/2002 |

* cited by examiner

FIG. 14

WATER LEAK DETECTION AND PREVENTION SYSTEMS AND METHODS

PRIORITY CLAIM

This application claims the benefit of U.S. Provisional Application No. 60/559,543 filed Apr. 5, 2004 and of U.S. Provisional Application No. 60/572,699 filed May 20, 2004, the disclosures of which are incorporated in their entirety herein by reference.

FIELD OF THE INVENTION

This invention relates to detecting and preventing accidental water leaks inside of homes and businesses.

BACKGROUND OF THE INVENTION

Water leaks in homes and businesses cause a tremendous amount of damage to structures and contents. Leaks generally occur from a burst water pipe or leaking faucets or water using appliances. If an occupant is present and the leak is easily visible, water damage can often be prevented. However many leaks occur behind cabinets and in the walls so that even if an occupant is present, the leaks may not be discovered until a very substantial amount of damage has been caused. It is not uncommon for an undetected leak to literally create havoc and require major reconstruction to return the building to a usable state. Moreover, leaks induce the growth of hazardous mold.

A number of published articles relate to an increasing rate of claims against insurance companies for water damage claims and the resultant increase in cost and difficulty in obtaining insurance for homes and businesses in which water leakage claims have previously been made. See, e.g., in *Money* magazine, April 2003, the article by Lisa Gibbs and the web sites: http://www.iii.org/media/facts/statsbyissue/homeowners/ http://www.rmiia.com/Homeowners/water_damage.htm.

SUMMARY OF THE INVENTION

One aspect of embodiments of this invention is to prevent any substantial leak in a home or business by disconnecting the home or business building from the high pressure water in the water main during those periods of time when there is no water demand within the home or business building. In most buildings, in fact, such periods are the majority of the time that the building is occupied.

Another aspect of embodiments of this invention is to continuously monitor and detect any leak of consequence in the home or building during those periods of time when the home or business building is disconnected from the high pressure water in this water main.

Another aspect of embodiments of this invention is to prevent the flow of water into a building by blocking water flow from the main water supply unless two conditions are met:
1. Water is actually demanded at a normal water outlet (e.g., faucet, toilet, shower, dishwasher, clothes washer, refrigerator, and humidifier).
2. No leaks in the buildings water system (e.g., cracks in water lines, loose fittings or pipes, ruptured hoses in appliances) has been detected while the water flow from the main has been blocked.

An aspect of embodiments of this invention is to continually monitor and detect any leak of consequence in this home or building when no water is flowing in the building's water pipes.

Still another aspect of embodiments of this invention is to prevent substantial damage when the occupant or an appliance inadvertently demands water from the main when in fact, such demand is due to the forgetfulness of the occupant to turn off a faucet or failure of an appliance to turn off its demand for water.

BRIEF DESCRIPTION OF THE DRAWINGS

FIG. 14 is a front view of a faucet having an embodiment of a faucet having a small red light to indicate when the faucet is turned on.

FIG. 16 is a side view of a modified faucet having a small red light to indicate when the faucet is turned on.

DETAILED DESCRIPTION OF THE PREFERRED EMBODIMENT

The conventional home and business is continuously at risk for water leaks. Such leaks can be disastrous and expensive. In the conventional home or business (not shown), the cold and hot water pipes extend throughout the structure and are continuously connected to the water main supplying water under pressure. As a result, any ruptures in the water system will instantly result in a water leak. Moreover, since the water pipes are often hidden within the walls of the building, it may take, even in an occupied home or business building, several hours or even days for a leaking pipe or joint to manifest itself, such that by the time of discovery, substantial damage can be done not only to the building and furnishings, but also create a serious mold problem.

Figure 1:
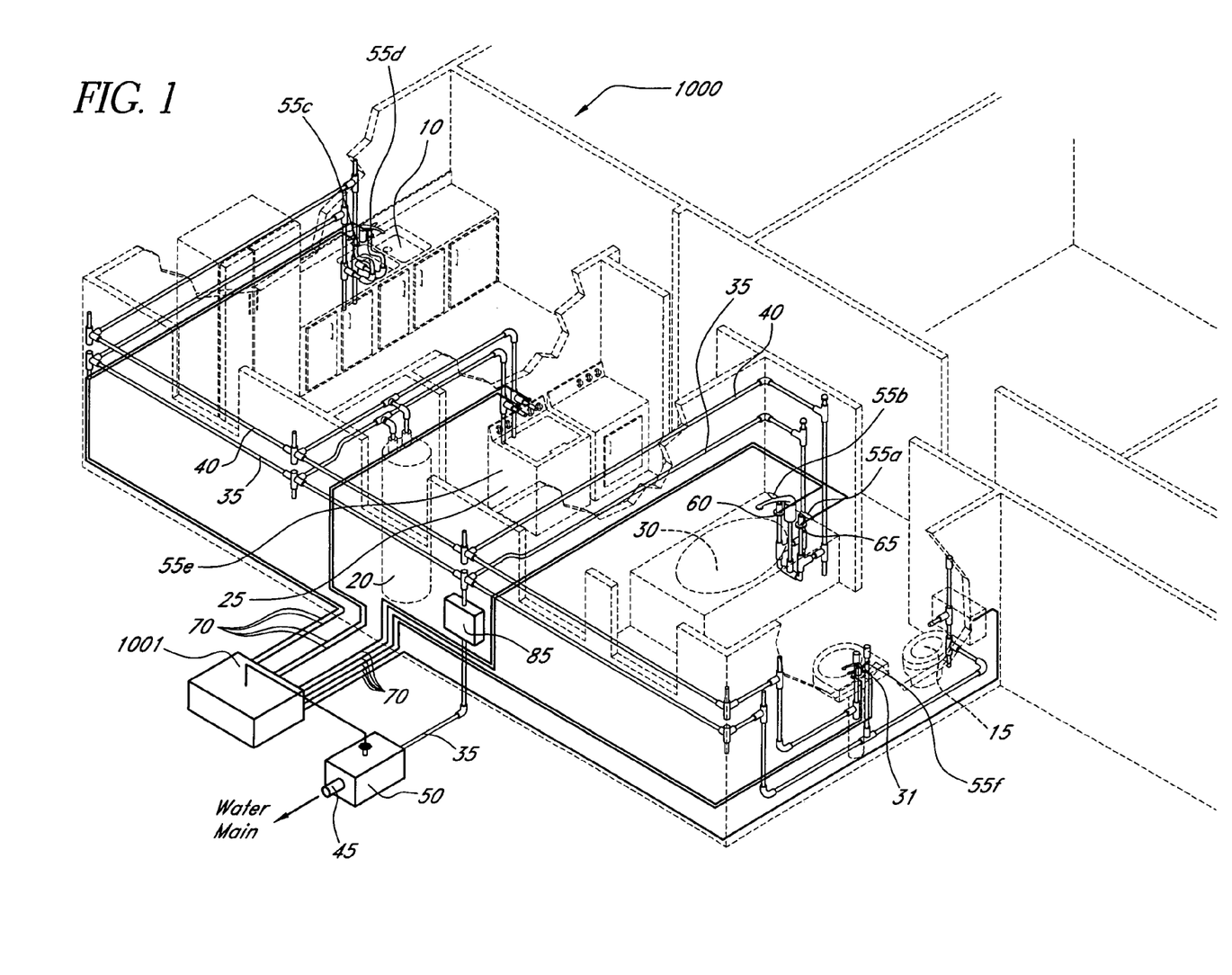
FIG. 1 is a perspective view of one embodiment of a water leak detection and prevention system.

In the embodiment of FIG. 1, however, the risk of water damage due to a leak or leaks in the plumbing is very substantially reduced.

FIG. 1 illustrates a representative home or business 1000 plumbed for several water using appliances, such as, for example, a sink 10, toilet 15, hot water heater 20, clothes washer 25, bathtub 30 and bath sink 31. Each of these appliances is typically connected to a cold water pipe 35. A hot water pipe 40 connected to the outlet of the hot water heater 20 is typically connected to all of the other appliances, except the toilet.

Between the cold water pipe 35 and the main water supply 45 is an electric shutoff valve 50. Valve 50 is located either within this building or outside of the building close to the main 45. The fail safe mode for this valve is its closed, shutoff state, i.e., if the electricity to the building is off for any reason, the only water in the cold water and hot water pipes 35, 40 is the water remaining from when the valve 50 was last turned off.

Figure 3:
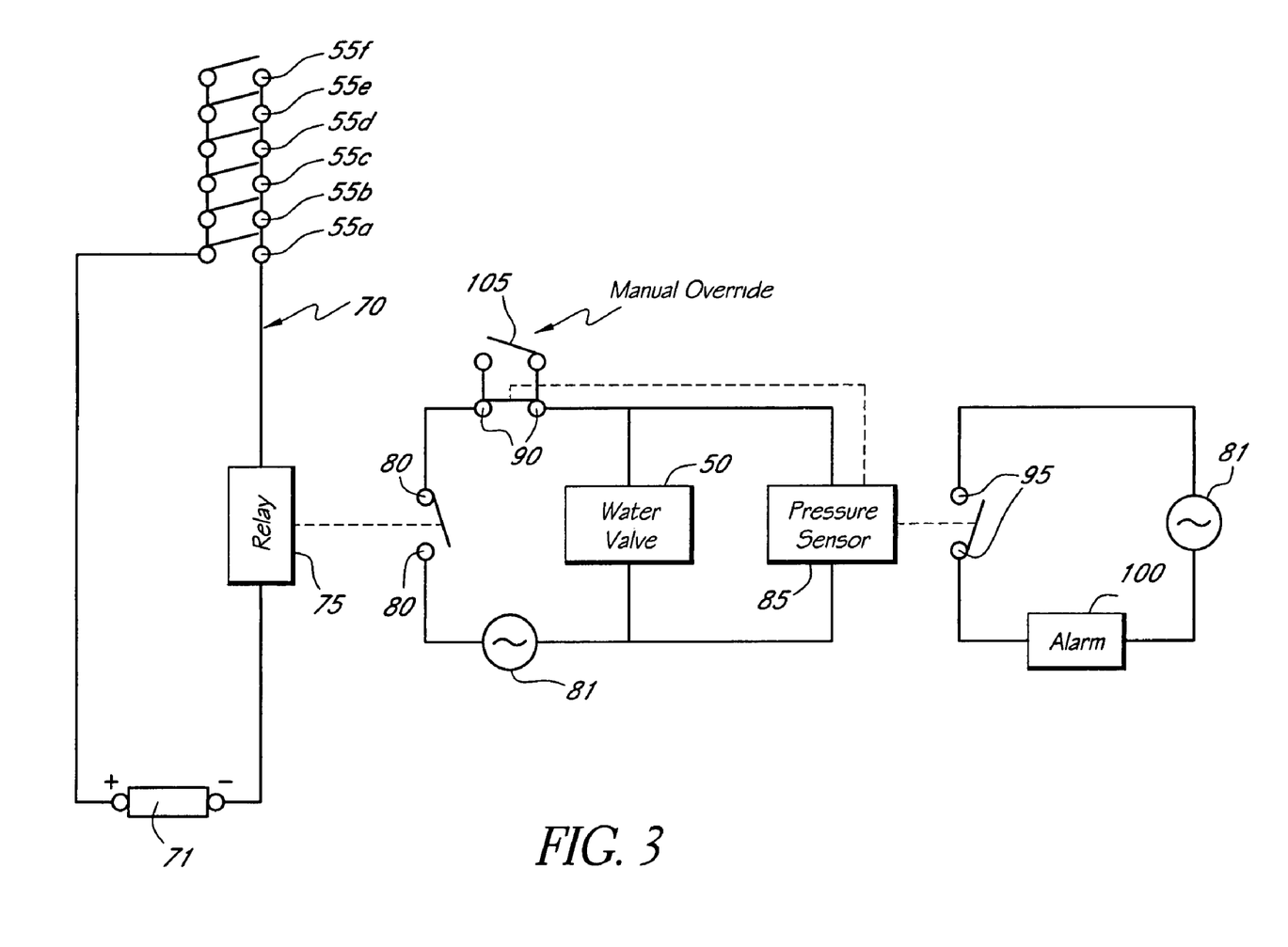
FIG. 3 is a detailed circuit schematic for the water leak detection and prevention system of FIG. 1.

In normal operation, the electrical shutoff valve 50 is opened by control circuit 1001 only when a water valve within the house or business is deliberately actuated by an individual opening a faucet or by operation of an electrical appliance connected to either one or both of the hot water and cold water pipes 35, 40. Referring to FIGS. 1 and 3, each water-using device in the building includes an on/off switch 55*a*, 55*b*, 55*c* . . . 55*f* connected to a low voltage network 70. Thus, the hot and cold bath faucets 60, 65 are connected by low voltage network wires 70 to the control circuits shown in FIG. 3. Each water-using appliance typically already has an electrically actuated inlet valve. For existing appliances, it is advantageous to connect the low voltage network 70 to the control circuits of each electrical appliance so that each time the dishwasher, clothes washer, etc. demands water by opening its water inlet valve, the signal generated by the appliance not only opens the inlet valve of the particular appliance, but also functions as one of the switches 55*a*, 55*b*, 55*c* . . . 55*f*.

Figure 4:
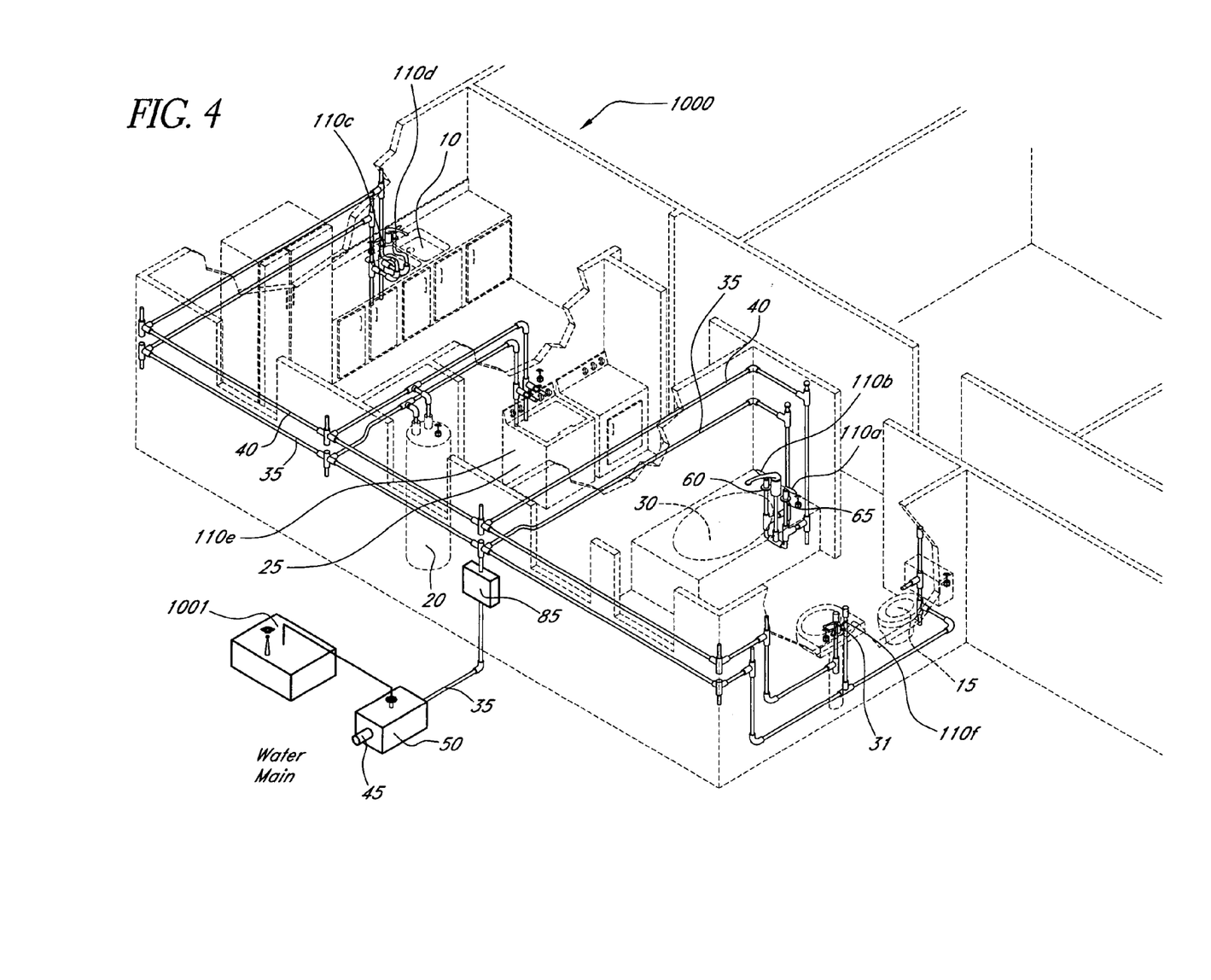
FIG. 4 is a perspective view of an embodiment in which some or all of the appliances have a wireless connection to the water leak detection and prevention control system.

In the embodiment illustrated in FIGS. 1, 2 and 3, a wired connection is made to each existing water-using electrical appliance, whereas, in another embodiment described below and illustrated in FIGS. 4 and 5, wireless signals are sent from some or all of the appliances to avoid the necessity of hardwiring an existing home or business building. The switches 55*a*, 55*b*, 55*c* . . . 55*f* are electrically connected in parallel so that closure of any switch results in the delivery of electrical current from a low voltage source 71 (typically 12 volts) to relay switch 75. Flow of current to relay 75 causes the relay to be energized and close switch contacts 80. Closure of contacts 80 completes the circuit from line voltage 81 causing the shutoff valve 50 to turn on. Water then flows from the main 45 to the demanding appliance. Thus, whenever water is demanded in the home or business, an electrical switch 55*a*, 55*b*, 55*c* . . . 55*f* is closed in the demanding appliance to cause the normally closed electrical shutoff valve 50 to open and deliver water from the main 45 to the demanding appliance.

When water is no longer demanded by a particular appliance, the switch 55*a-f* associated with this appliance is opened, either when the user closes a faucet or the clothes washer or other operating appliance closes its water inlet valve. As a result, when no main water is needed, all of the appliance switches 55*a-f* will be in their open state and no current will be delivered to the electrical shutoff valve 50, thereby disconnecting the main water supply from the home or business and preventing the main water pressure from causing a water leak in the home or business while this valve 50 is shut.

Figure 2:
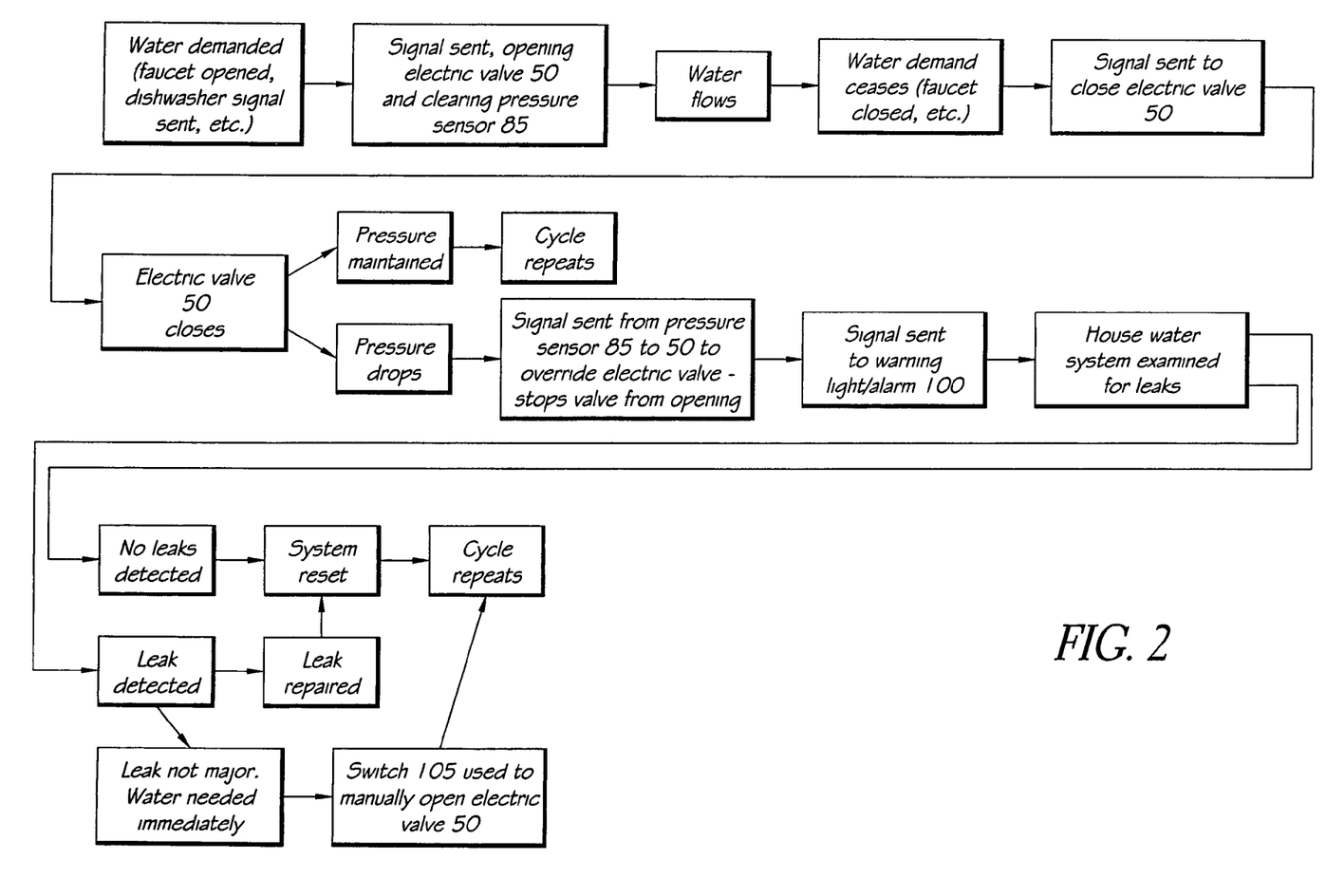
FIG. 2 is a flow chart showing the operation of the embodiment of FIGS. 1-6.

The embodiment of the invention illustrated in FIGS. 1, 2 and 3 also provides for automatically detecting a leak in the home or business by detecting a decrease in water pressure within the water pipes of the home when the shutoff valve has been closed. Referring now to FIGS. 1 and 3, a pressure sensor 85 is incorporated in the water line between all of the water-using appliances and the electrical shutoff valve 50. This pressure sensor 85 continuously monitors the pressure in the water line 35 during the periods of time that the electric shutoff valve 50 is closed. With no water pressure being supplied from outside the home or business, any decrease in the water pressure within the business or home water pipes will necessarily be caused by water leakage from either the cold water pipe 35, the hot water pipe 40 or an appliance connected to a water pipe somewhere in the home or business.

Referring now to FIG. 3, pressure sensor 85 is connected to a normally closed relay contacts 90 and to a normally open contacts 95. When the pressure sensor detects a drop in water pressure in the home or business water pipes, it opens the normally closed relay contacts 90 and closes the normally closed relay switch 95. Opening relay contacts 90 opens the circuit to the electrical shutoff valve 50. As a result, any demand for water in the house or business (e.g., opening a faucet) after detection of any leak will fail to actuate value 50 so that no water flows into the home or business from the water main. Actuation of the relay contact 95 to the closed position also closes the electrical circuit to an alarm located in the home or business. Advantageously, this alarm includes both a warning light and audible alarm 100. Thus detection of a water leak results in (a) cutting off power to shutoff valve 50, thus preventing any water flow into the home or business and (b) engaging either or both warning light and alarm 100. The light and alarm alert the occupant(s) of the building to a leak in their water system. In some systems, the signal may also, for example, engage an external communication to a home security business so that an unoccupied home or business may be inspected.

If upon investigation the leak is a minor one such as a slowly dripping faucet, the occupant can decide to still allow water to flow into the building. If so, they simply close a manual override switch 105 which allows the water valve 50 to be energized each time a faucet or appliance demanding water is actuated.

Pressure sensor 85 is automatically cleared or reset each time the electrical shutoff valve 50 is energized. Thus, as shown in FIG. 3, the pressure sensor reset circuit is connected in parallel to the water valve 50 so as to be reset each time the water valve 50 is actuated.

The embodiment of FIGS. 1 and 3 described above illustrates a system in which a low voltage network 70 is hardwired. In the embodiment of FIGS. 4 and 5, each water-using appliance such as the sink 10, toilet 15, hot water heater 20, clothes washer 25 and bathtub 30 includes a wireless link to the water detection and leak prevention circuitry. The embodiment of FIGS. 4 and 5 is particularly advantageous for retrofitting existing homes and business buildings since it eliminates the need to hardwire a low voltage network throughout the home or business. In the embodiment of FIGS. 4 and 5, each faucet and each electrical appliance is fitted with a wireless signal transmitter 110. Typically, such radio frequency (rf) units 110*a*, 110*b*, 110*c* . . . 110*f* are small, inexpensive battery-powered units. An rf receiver 115 is located proximate to and directly connected to the relay actuating the electrical shutoff valve 50. Upon receipt of a wireless signal from a transmittal 110*a*, 110*b*, 110*c* . . . 110*f*, the receiver 115 causes relay 116 to close switch contacts 117 and delivers current to water valve 50.

Figure 5:
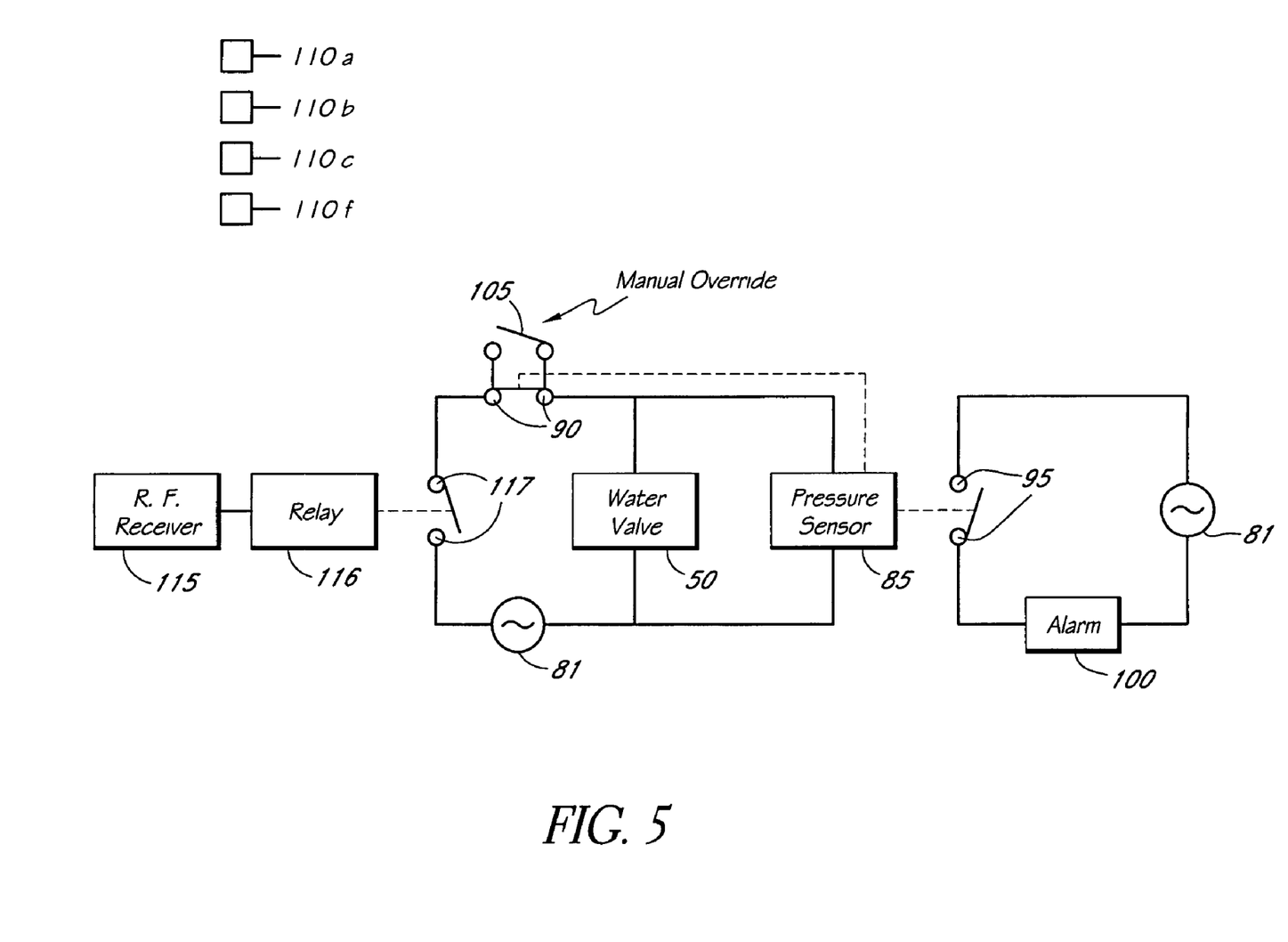
FIG. 5 is a detailed circuit schematic for the leak detection and prevention system of FIG. 4.

The operation of the system illustrated in FIGS. 1, 3 and 5 is further illustrated by the flow chart of FIG. 2.

For existing construction, the building's water supply can be fitted with either a hardwire-controlled or a wireless signal-controlled electric shutoff valve 50. If the owner of an existing building chooses to have a hardwired system, then all faucets will be replaced with signal sending faucets and all other water-using appliances (dishwasher, clothes washer, ice maker, humidifier, etc.) will be spliced into so that all faucets and other devices will be wired into the system. The second option of installing a wireless signal-controlled system in an existing building does not require as much labor and expense as the installation of a hardwired system. With the wireless signal-controlled shutoff valve 50, faucets and toilets are fitted with signal sending devices that send wireless signals (much like a garage door opener) when water is demanded. All other devices (dishwasher, clothes washer, ice maker, humidifier, etc.) are spliced into and also fitted with wireless signal sending devices. The signal sent by these signal sending devices is received by the receiver 115, opening the valve and allowing water into the building. The wireless signal sending devices for the faucets and toilets are small in size and battery operated. The wireless signal sending devices for all other devices (dishwasher, clothes washer, ice maker, humidifier, etc.) are advantageously wired into the existing electrical system, eliminating the need for battery operation.

It will be apparent that other embodiments can include both hardwired and wireless components to cause closure of the circuit to deliver power to water valve 50.

Each wireless signal sending device (on faucets, toilets, and other devices) has advantageously a small red light (see light 120 in FIG. 15) that lights whenever a signal is being sent by the device. This red indicator light is intended to alert building occupants to any false signals being sent by the signal sending devices, which would unintentionally open the shutoff valve 50 exposing a building to accidental water leakage or discharge.

Figure 6:
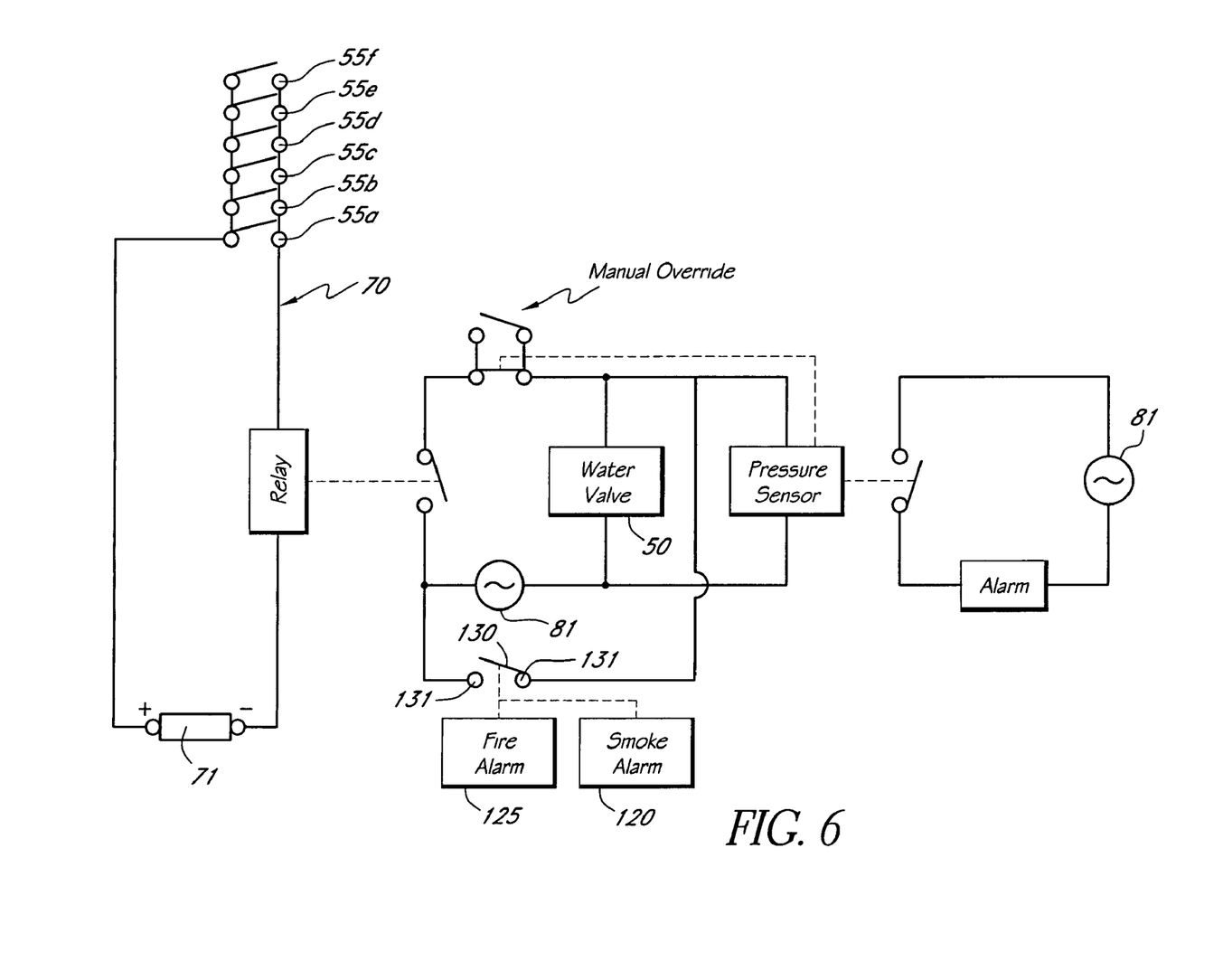
FIG. 6 is a detailed circuit schematic for the leak detection and prevention system, including a smoke or fire alarm override.

The embodiment of FIG. 6 illustrates a hardwired embodiment for buildings having a built-in sprinkler system. Although the system shown is hardwired to each faucet and water using appliance it will be apparent that the system can be a wireless system or a combination hardwired and wireless system. An override circuit includes one or more fire alarm sensor 120 or smoke alarm sensor 125 connected by a wired or wireless link to a fire/smoke alarm relay 130. When fire or smoke is detected by the sensor 115 or 120, normally open relay 130 is energized to close contacts 130. As a result, the circuit connecting line voltage 81 to shutoff valve 50 is closed so as to continuously connect the water shutoff valve to electricity to ensure that water from the main 45 can freely flow to the sprinklers within the building.

Figure 7:
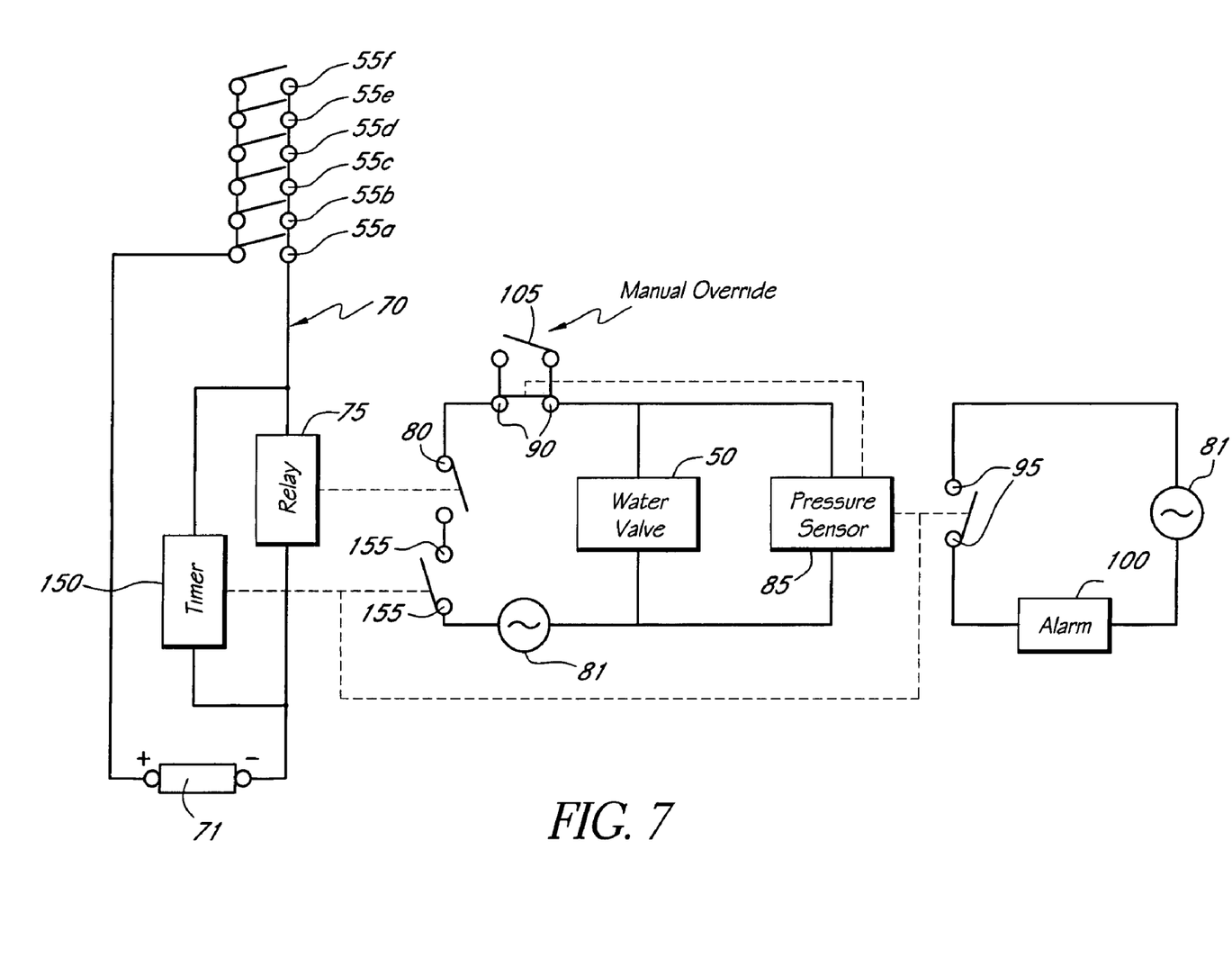
FIG. 7 is a detailed circuit schematic for a leak detection and prevention system including a timer override control.
Figure 8:
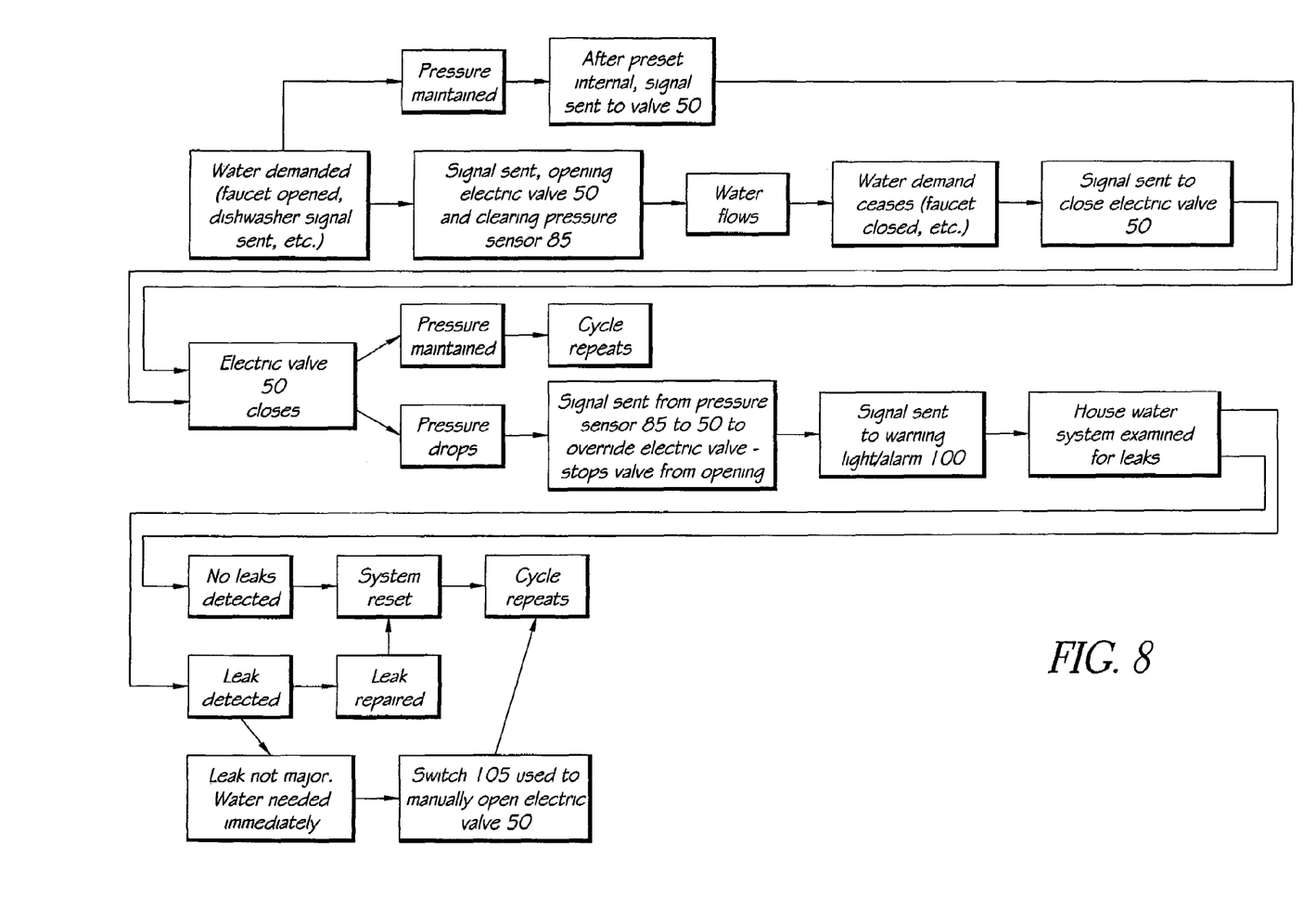
FIG. 8 is a flow chart showing the operation of the embodiment of FIG. 17.

FIGS. 7 and 8 illustrate an embodiment which prevents substantial flooding in a home or business building when a user forgetfully leaves a faucet on or an appliance control such as the timer control in a dishwasher or clothes washer fails to close valve 50. A timer 150 is automatically triggered each time the relay 75 is activated to start timing a preset interval. Timer 150 is preset to a time limit sufficient for the normal time cycle of an appliance or the normal time that a faucet is open for washing or bathing. A typical setting for timer 100 is a one hour preset time period. At the end of this his preset time interval, timer 150 opens normal closed relay contacts 155 to disconnect the water valve 50 from line voltage 81, thus shutting off the supply of water into the home. As shown, timer 150 is also advantageously connected to close relay contacts 55 to cause alarm to sound and notify the occupant of the building.

Advantageously, the timer 150 will automatically reset when the switch 55a-f is located and opened. Alternatively, the timer may include a manual override to reset it if a period of water inflow from the main 45 is needed for a longer period than the time that has been preset into timer 150.

Figure 9:
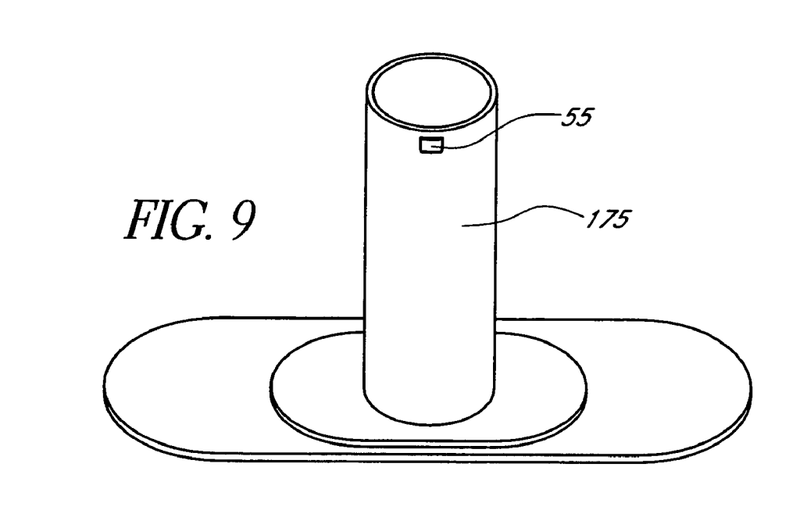
FIG. 9 is a front view of a faucet having an electrical on-off switch.
Figure 10:
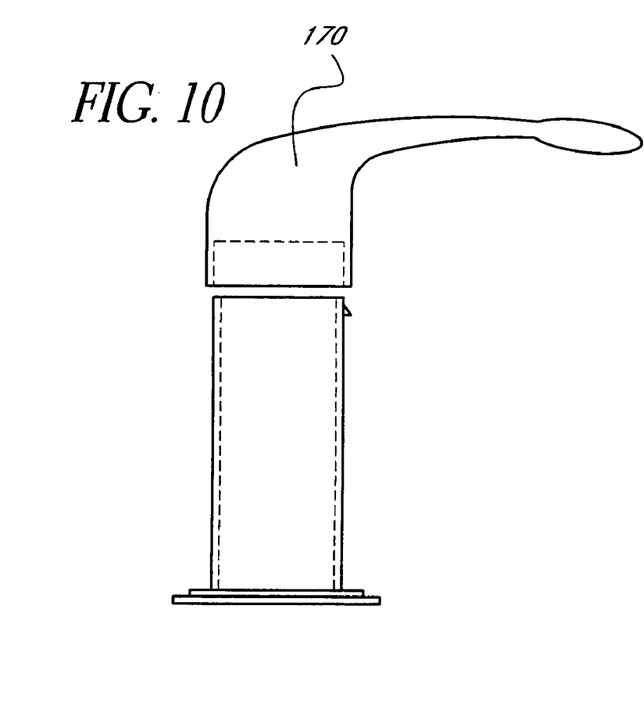
FIG. 10 is a side view of the faucet of FIG. 7.
Figure 11:
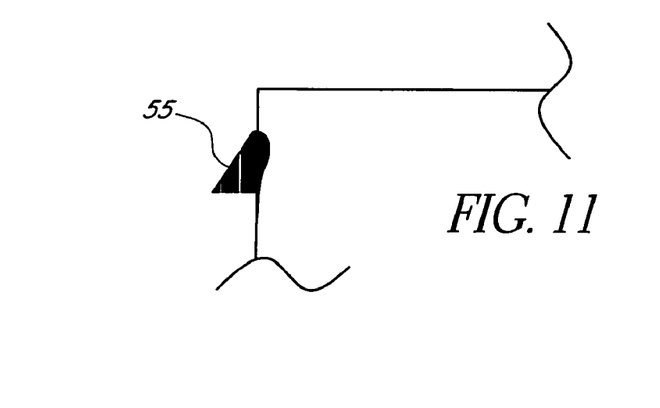
FIG. 11 is a cutaway view of the faucet of FIGS. 7 and 8.
Figure 12:
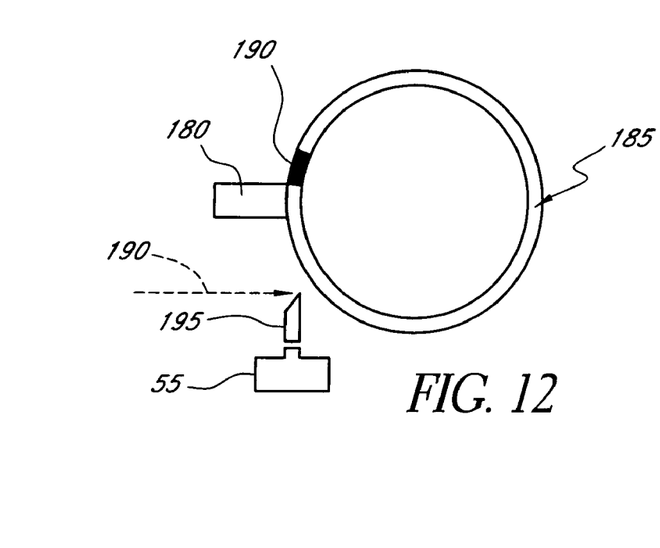
FIG. 12 is a top view of another embodiment of a faucet having an electrical on-off switch.
Figure 13:
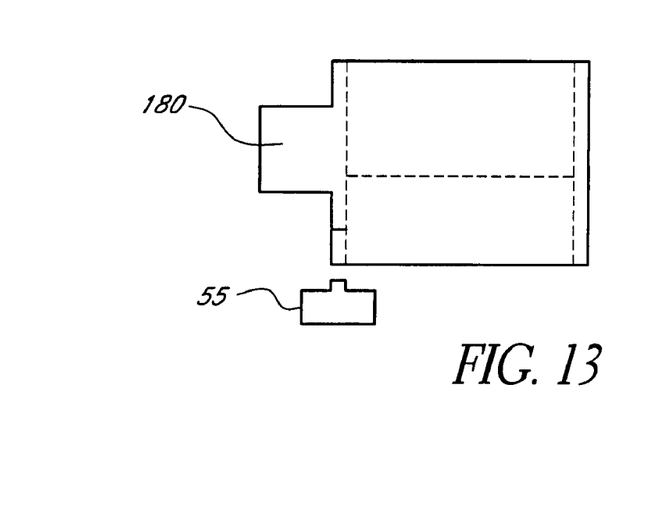
FIG. 13 is a side view of the faucet of FIG. 12.

Different embodiments of signal sending faucets will now be described. FIGS. 9, 10 and 11 illustrate a design compatible with faucets that operate by means of a handle being lifted. Another design intended to be compatible with faucets that operate by means of a rotating handle as shown in FIGS. 12 and 13. Both faucets types (lifted handle and rotating handle) can be fitted with components designed to send wireless signal whenever the faucet is opened (see FIGS. 14, 15 and 16), in lieu of the hardwired design. FIGS. 9 through 11 illustrate the basic design of the lifted handle signal sending faucet. The handle 170 of the faucet is mounted on a faucet base 175 that houses the normal parts needed to provide a flow of water. The top section of the base is double-walled and insulated, creating a hollow section between the two walls. Inside the hollow section, at the front of the faucet, an electrical switch 55 is mounted. The movable top part of that protrudes out of the front of the faucet base. Any time there is no water demand, the faucet handle is in the down position. Having the handle in the down position pushes in the protruding button and opens a switch 55. When the faucet handle is lifted (water is demanded), the protruding button pops out of the faucet base, closing the switch contacts and closing the electrical circuit shown in FIG. 3. This closes the circuit to water valve 50 and allows water to flow into the building.

FIGS. 12 and 13 illustrates the basic design of a rotating handle signal sending faucet. The handle 180 of the faucet is mounted on a faucet valve that allows water to flow whenever the faucet handle is rotated. The outer section 185 of the faucet handle is double-walled and insulated, creating a hollow section between the two walls. Inside the hollow section is a horizontally mounted tapered section 190. Whenever the faucet handle is turned to the "off" (no water demand) position, the tapered section 190 moves towards and pushes down a popup button 195 also located inside the hollow section of the faucet handle. The button 195 and associated switch 55 is permanently mounted and does not rotate with the faucet handle. The button 195 engages a switch 55. When the faucet handle is turned to the "on" (water is demanded) position, the tapered section 190 rotates away from the popup button 195, allowing the button to pop up into the hollow section of the faucet handle. The button popping up closes the contacts of switch 55 and closes the electrical circuit to water valve 50 allowing water to flow into the building to the faucet.

Figure 14:
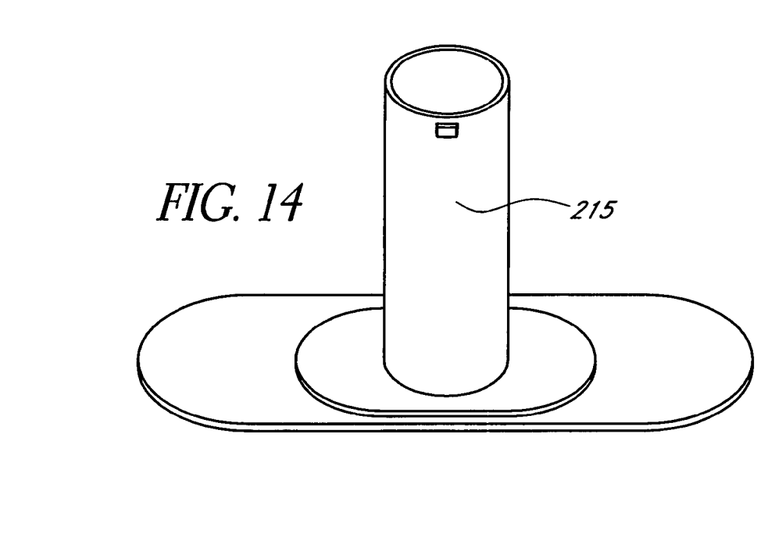
Figure 15:
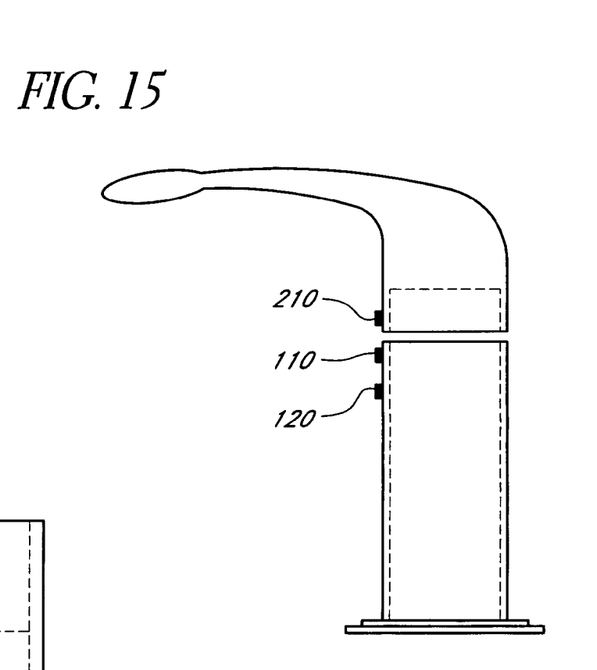
FIG. 15 is a side view of the faucet of FIG. 14.
Figure 16:
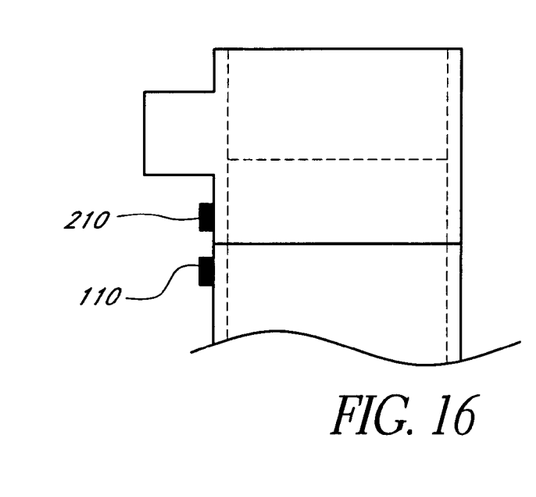

FIGS. 14, 15 and 16 illustrates lifted handle and rotating handle faucets fitted with signal sending devices that send wireless signals (much like a remote controlled garage door opener) when water is demanded. For both lifted handle and rotating handle faucets, the design consists of two parts—the signal transmitter 110 and the actuator 210. For both lifted handle and rotating handle faucets, the signal transmitter 110 is advantageous mounted onto the base 215 of the faucet by means of a mounting bracket that the piece snaps into. This part contains the power (a small battery) needed to send a signal, and is a sealed component. Whenever the battery in this part becomes too low to operate, the signal sending piece is snapped out of its mounting bracket and a new signal piece with a fresh battery is snapped in. Keeping this piece sealed (and not allowing simple battery replacement) avoids potential problems caused by water contamination. The signal transmitter advantageously has a small red light that illuminates whenever a signal is sent. This light serves two purposes. It alerts the user to a signal being sent (allowing the user to detect any false signals), and also alerts the user to a low battery by means of a weak light. Whenever water is demanded (faucet handle is lifted or rotated) the signal transmitter 110 (bottom part) and the actuator piece (top part) are separated. When the top and bottom parts are separated, e.g., when the faucet is turned on, the transmitter 110 is activated, illuminating the small red light 120 and sending a wireless signal to the remote receiver 115 shown in FIG. 5 to cause water valve 50 to open, allowing water to flow into the building.

It will be understood that the embodiments of the invention are not limited or restricted to any particular form of faucet constructed with an integral on-off switch. Representative prior art faucets having an integral switch include U.S. Pat. Nos. 4,092,025; 2,777,675; 5,911,240; 4,856,121.

The above presents a description of the best mode contemplated for carrying out water leak detection and prevention systems and methods in such full, clear, concise and exact terms as to enable any person skilled in this art to which it pertains to make and use these systems and methods. These systems and methods are, however, susceptible to modifications and alternate constructions from that discussed above that are fully equivalent. Consequently, these systems and methods are not limited to the particular embodiments disclosed. On the contrary, these systems and methods cover all modifications and alternate constructions coming within the spirit and scope of the present invention.

What is claimed is:

1. A system for protecting a home or business building from flooding caused by a leak or rupture in the building plumbing and for prompt detection of a leak or rupture in the plumbing system or water using appliances when the main water supply is disconnected from the building plumbing comprising
    an electrically controlled shut-off water valve connected between the main water supply to said building and the building plumbing, said water valve having a fail safe shut mode when no electrical power is supplied to said valve so that no water from said main water supply is supplied to said building plumbing when no electrical power is delivered to said valve,
    a low voltage network in said building connected to substantially all of the water using appliances in said building, said network being engaged whenever a water using appliance connected to said building plumbing demands a flow of water from said main water supply,
    said low voltage network coupled to said electrically controlled water valve so that said normally closed valve is opened, upon demand from a water using appliance, and allow delivery of water from said main water supply to said water demanding appliance,
    a water pressure sensor connected in said building plumbing for detecting a change in pressure of the water in said plumbing during periods of time that said water valve shuts off the water main from said building plumbing
    an alarm,
    said water pressure sensor coupled to said alarm when a predetermined change in water pressure is detected, and
    a timer preset to a predetermined timer interval, said timer responsive to water demand at a faucet or appliance and coupled to open said circuit to said water valve at the end of said predetermined timer interval unless the faucet or appliance demanding water has been turned off during said timed interval.

2. A system for protecting a home or business building from flooding caused by a leak or rupture in the building plumbing and for prompt detection of a leak or rupture in the plumbing system or water using appliances when the main water supply is disconnected from the building plumbing comprising
    an electrically controlled shut-off water valve connected between the main water supply to said building and the building plumbing, said water valve having a fail safe shut mode when no electrical power is supplied to said valve so that no water from said main water supply is supplied to said building plumbing when no electrical power is delivered to said valve,
    control circuits responding to substantially all of the water using appliances in said building, said control circuits being engaged whenever a water using appliance connected to said building plumbing demands a flow of water from said main water supply,
    said control circuits coupled to said electrically controlled water valve so that said normally closed valve is opened, upon demand from a water using appliance, and allow delivery of water from said main water supply to said water demanding appliance,
    a water pressure sensor connected in said building plumbing for detecting a change in pressure of the water in said plumbing during periods of time that said water valve shuts off the water main from said building plumbing,
    an alarm, and
    said water pressure sensor coupled to said alarm when a predetermined change in water pressure is detected.

3. The system of claim 2 wherein a low voltage network in said building is connected to substantially all of the faucets and water using appliance in said building, said network being engaged whenever a faucet or water using appliance connected to said building plumbing demands a flow of water.

4. The system of claim 2 wherein each faucet and water using appliance has an electrical switch coupled to said low wattage network.

5. The system of claim 2 wherein having water using devices will generate a wireless signal to demand a flow of water and a receiver coupled to said control circuits and adapted to receive said wireless signals and cause said normally closed valve to open.

6. The system of claim 2 wherein an activated smoke sensor or fire alarm closes an electrical circuit to said water valve to maintain said water valve open and allow water into said building from said main water supply.

7. The system of claim 2 wherein a timer is triggered each time water is demanded, said timer preset to a time interval and coupled to said control circuits to automatically close said normally closed water valve at the end of said preset time interval to shut off the supply of water to said building from said main water supply.

* * * * *